United States Patent
Schafer et al.

(10) Patent No.: US 6,672,626 B1
(45) Date of Patent: Jan. 6, 2004

(54) CORRUGATED PIPE CONNECTION STABILIZING APPARATUS

(75) Inventors: Charlie J. Schafer, Panora, IA (US); Mark P. Gettler, Adair, IA (US); William Littler, IV, Adair, IA (US)

(73) Assignee: Agri Drain Corporation, Adair, IA (US)

( * ) Notice: Subject to any disclaimer, the term of this patent is extended or adjusted under 35 U.S.C. 154(b) by 0 days.

(21) Appl. No.: 10/201,745

(22) Filed: Jul. 23, 2002

(51) Int. Cl.⁷ ................... F16L 13/04; F16L 35/00; F16L 55/00
(52) U.S. Cl. ............ 285/114; 24/200; 285/903; 285/33
(58) Field of Search .............. 285/23, 114, 223, 285/260, 293.1, 903, 117; 24/197, 200, 164

(56) References Cited

U.S. PATENT DOCUMENTS

| | | | |
|---|---|---|---|
| 455,967 A | | 7/1891 | Lusk |
| 1,324,629 A | * | 12/1919 | Tabler ................... 24/200 |
| 2,605,744 A | * | 8/1952 | Urbanski ............... 24/197 |
| 3,768,843 A | * | 10/1973 | Burtis .................. 285/114 |
| 3,859,692 A | * | 1/1975 | Waterman et al. ....... 285/117 |
| 4,093,282 A | * | 6/1978 | Kyriakodis ............. 285/114 |
| 4,168,091 A | | 9/1979 | Boomgarden |
| 4,171,834 A | | 10/1979 | Abner |
| 4,273,367 A | | 6/1981 | Keeney |
| 4,307,903 A | * | 12/1981 | Wallace ................ 285/114 |
| 4,483,556 A | | 11/1984 | LiVolsi |
| 4,549,332 A | * | 10/1985 | Pouliot ................ 285/114 |
| 4,641,646 A | * | 2/1987 | Schultz et al. .......... 285/114 |
| 4,660,862 A | | 4/1987 | Cassel |
| 5,661,876 A | | 9/1997 | Goldenberg |
| 5,741,029 A | * | 4/1998 | Wilson ................. 285/114 |

\* cited by examiner

*Primary Examiner*—Lynne H. Browne
*Assistant Examiner*—Aaron Dunwoody
(74) *Attorney, Agent, or Firm*—Camille L. Urban; G. Brian Pingel

(57) ABSTRACT

The present invention provides an apparatus and method for stabilizing a joint between two sections of corrugated pipe. A first section of corrugated pipe is associated with a second section to form a joint. One flexible member with two ends is looped around the first section of pipe, secured against a corrugation, and the two ends are associated and tightened. A section of the flexible member is left as a tail. A second flexible member is installed the same way on the second section of pipe, again with a section left as a tail. Each tail is then stretched across the joint, threaded between the other flexible member and pipe, brought back across the joint, and cinched forming two axially aligned supports secured against a corrugation, such that two axially aligned support are formed.

16 Claims, 10 Drawing Sheets

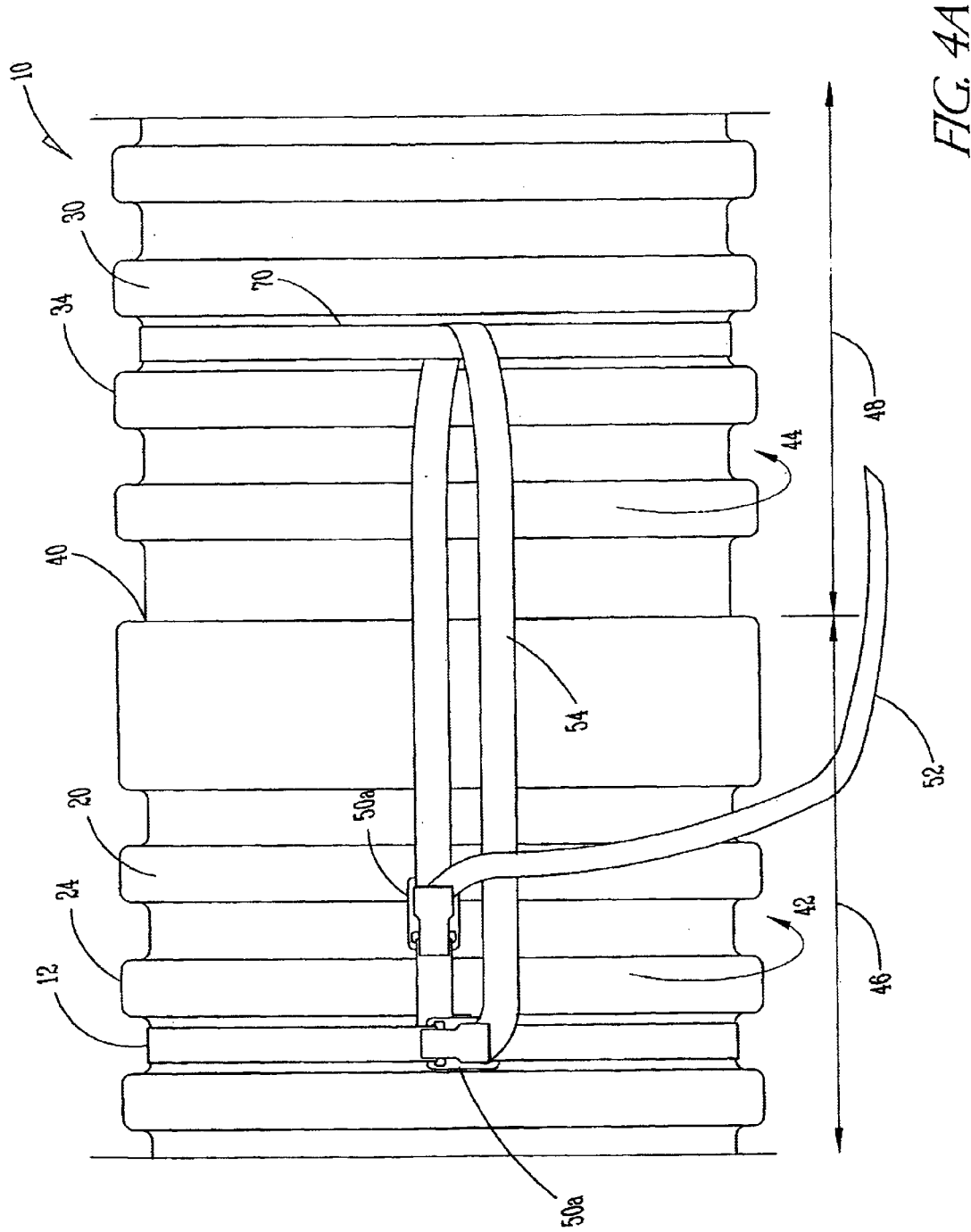

CORRUGATED PIPE CONNECTION STABILIZING APPARATUS

BACKGROUND OF THE INVENTION

1. Field of the Invention

The present invention relates in general to connections made between sections of corrugated pipe that are to be installed during construction and, more specifically, to an apparatus and method for stabilizing and strengthening the joint between two adjacent corrugated pipe sections against movement and disassociation while being installed.

2. Description of the Prior Art

It is known in the art to use various apparatuses and methods to assist in stabilizing, strengthening and maintaining connections between pipes, corrugated and otherwise.

For example, U.S. Pat. No. 4,168,091 to Boomgarden et at discloses a one-piece coupling connector for tubing wherein a bendable strap overlaps the joint between two pipe sections, includes retention pins on the interior of the strap for engaging the corrugations on the pipe, is equipped on one end with slots along the sides of which are teeth on the interior side of the strap member, and the other end includes a pair of tongues which correspond to and align with the slots when the bendable strap is wrapped around the joint to hold it in place.

Split sleeves are popular for this purpose as well. For example, U.S. Pat. Nos. 4,171,834 to Abner and U.S. Pat. No. 4,273,367 to Keeney et al. disclose simple devices which comprise split sleeves which fit around the overlap of adjacent ends of two sections of corrugated pipes. Tabs or teeth on the underside of the split sleeve are received within the corrugations of the pipe and serve to help secure the two pipe ends in jointed relationship. Means for fastening the ends of the sleeve around the corrugated pipe joint are provided.

In addition, devices to stabilize pipe joints which do not involve corrugated pipe and are not installed during construction have also been disclosed. U.S. Pat. No. 4,660,862 discloses a clamping band around the overlap region of the pipe joint which can be tightened for clamping the pipes together, and a second band attached and around an inside pipe. The two bands are connected together with a linking bar to form a pipe coupling with improved pull-apart strength. And, there are other clamping devices that have been disclosed as evidenced by U.S. Pat. Nos. 455,967; 5,661,876; and 4,483,556 all of which operate, in general, by providing a device which is mounted on or placed on the outer surface of a pipe or hose in which a second pipe or fixture will be telescopically associated. These are mostly designed to be used with a flexible hose that is to be connected to a fixture. By tightening one of these devices on the outside of the flexible hose, the connection between it and a fixture can be stabilized as well as leak proofed.

The present invention differs from the above referenced inventions and others similar in that these prior devices do not provide a simple, disposable, and adjustable devices for providing axially aligned support for the joint of two corrugated pipe sections.

It is therefore one objective of the present invention to provide a simply constructed and simply used apparatus for stabilizing and strengthening the joint between two sections of corrugated pipe against the normal stresses of installation;

It is a second objective of the present invention to provide an apparatus for strengthening and stabilizing the joint between two sections of corrugated pipe that is fully adjustable to any diameter of pipe as well as adjustable with regard to the need for pull-apart strength;

It is a final objective of the present invention to provide an apparatus of the nature just described that is inexpensively manufactured and, therefore, intended to be left on the joint as it is installed in construction without intolerably increasing the cost of construction.

SUMMARY

The present invention provides an apparatus and a method for strengthening and stabilizing a joint between two sections of corrugated pipe. The male end of a first section of corrugated pipe is associated with the female end of a second section of corrugated pipe to form a joint. The apparatus includes at least a first flexible member with two ends. The first flexible member is looped circumferentially around the first section of corrugated pipe and is secured against a corrugation by means for associating said first end with said second end and for tightening said flexible member circumferentially. A relatively long section of the flexible member is left unrestrained as a tail. The tail portion is then stretched across the joint and looped around and secured against a corrugation on the second section of the corrugated pipe. The remaining tail portion is then brought back a second time across said joint. Means for cinching the tail portion to the first end of the flexible member are provided such that an axially aligned support is formed by the tail portion stretched back and forth across the joint and cinched tightly.

It is desirable to have axially aligned supports circumferentially spaced apart across the joint. Such an arrangement provides more stability in the joint as the pipe sections and joint are being installed. Therefore, in the preferred embodiment, there is a second flexible member. The first flexible member is looped circumferentially around the first corrugated pipe section and means for associating the first end with the second end are used to secure the first flexible member against a corrugation. As in the previous arrangement, a relatively long tail portion is left unrestrained. The second flexible member is looped circumferentially around the second pipe section and means for associating the first end with the second end are used to secure the second flexible member against a corrugation. In the same manner as described for the first flexible member, a second tail portion is left unrestrained. Means for cinching the tail portion of the first flexible member to the first end of the first flexible member are provided for creating an axially aligned support between the first flexible member and the second flexible member.

More specifically, the tail portion on the first flexible member on the first pipe section is stretched across the joint and then threaded between the second flexible member which has been looped around the second pipe section and the second pipe section, brought back across the joint, and then attached by means for cinching the tail portion of the first flexible member to the first end of the first flexible member. The same kind of axially aligned connection is also made between the tail of the second member on the second pipe to the first flexible member on the first pipe. Preferably, at least two flexible members are used and the axially aligned connections are spaced apart around said joint to increase stability and strength of the joint. It is contemplated that additional flexible members, also spaced apart, may be added for additional support.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 4A is a perspective view of the joint in FIG. 4 wherein means for associating a first end with a second end is a threadable connector with teeth;

DESCRIPTION OF THE PREFERRED EMBODIMENT(S)

Figure 1:
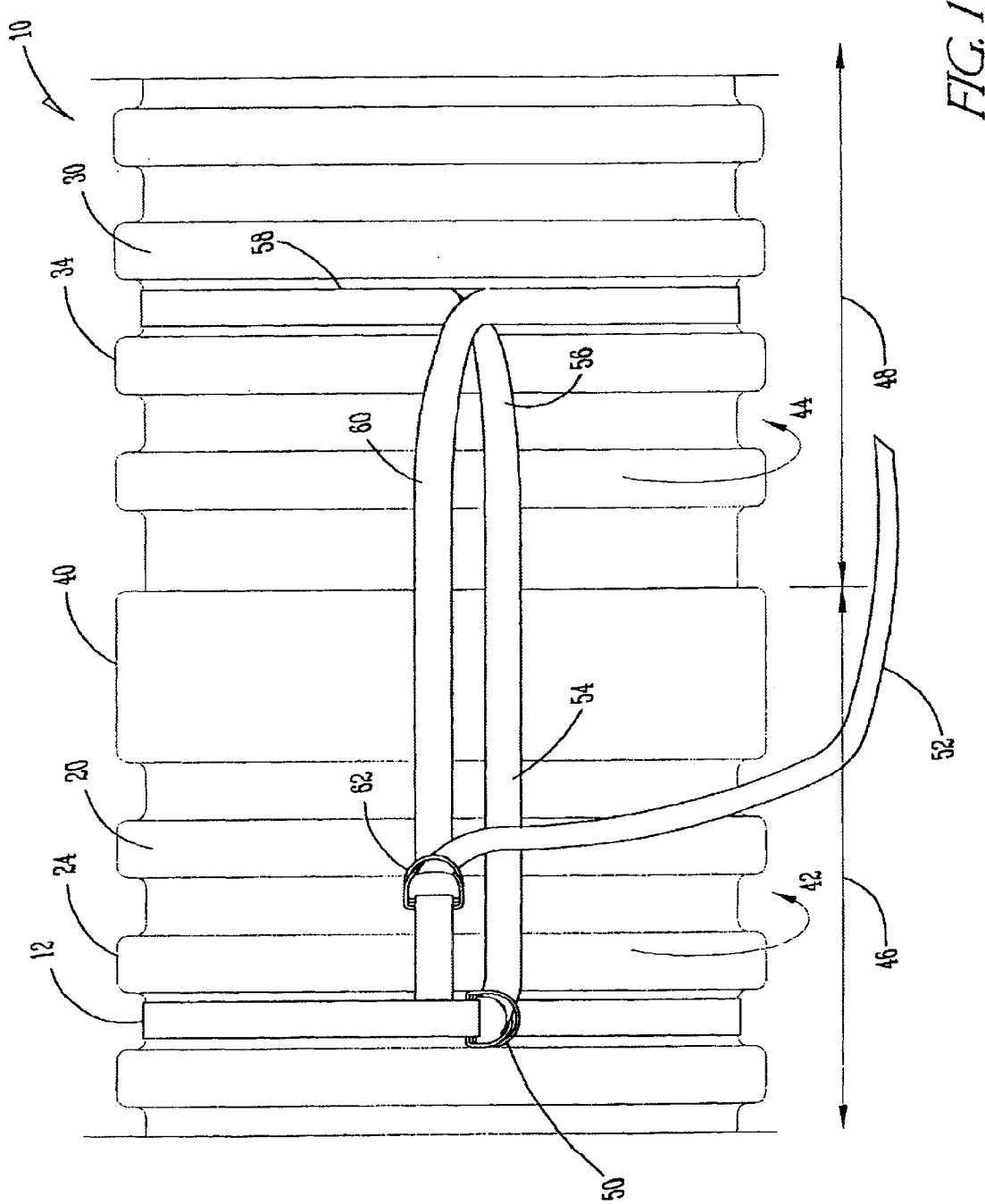
FIG. 1 is a perspective view of a joint of two sections of corrugated pipe showing a first embodiment of the stabilizing apparatus of the present invention.
Figure 1A:
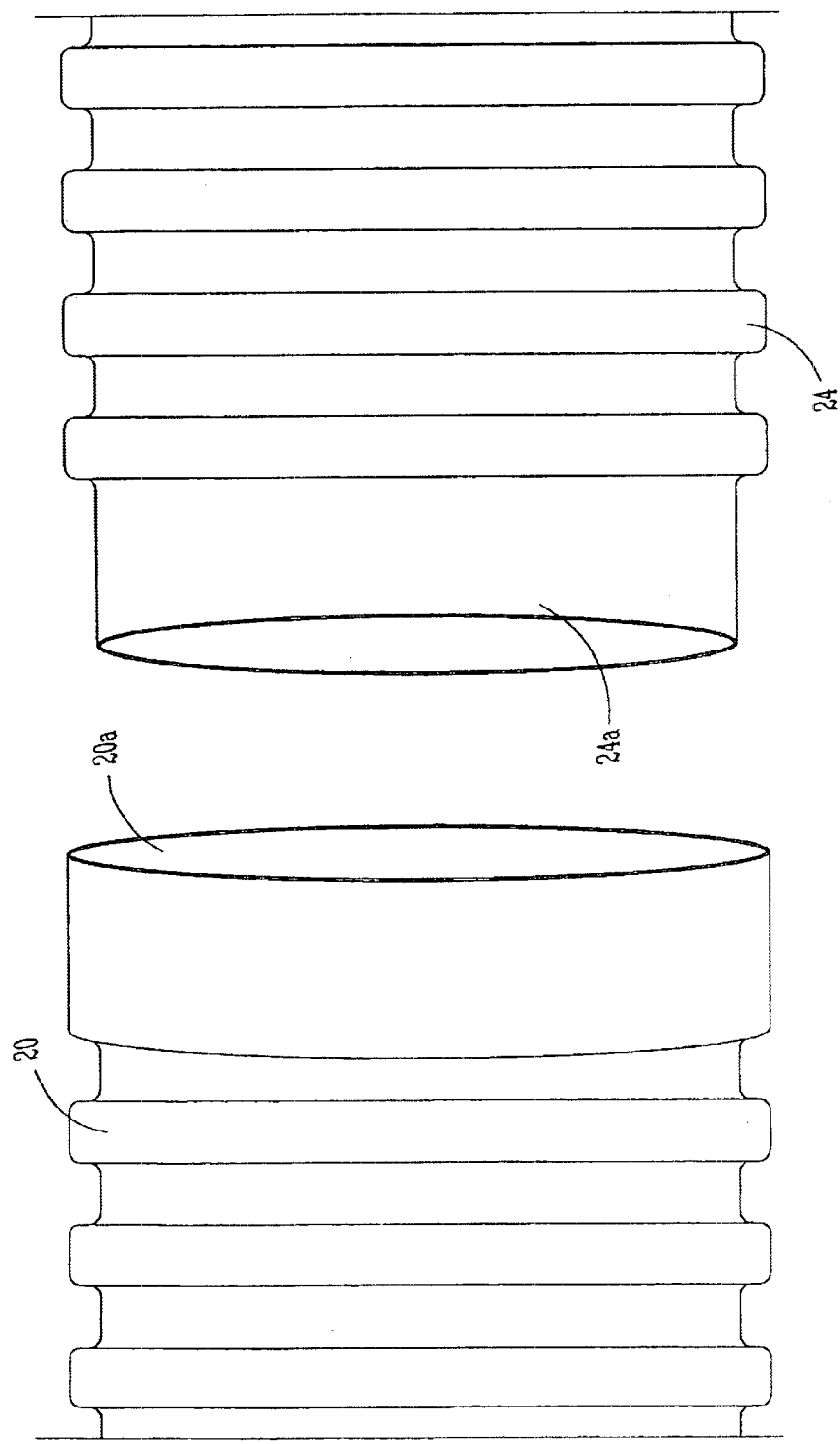
FIG. 1A is a perspective view of the two sections of corrugated pipe before they are joined.
Figure 2:
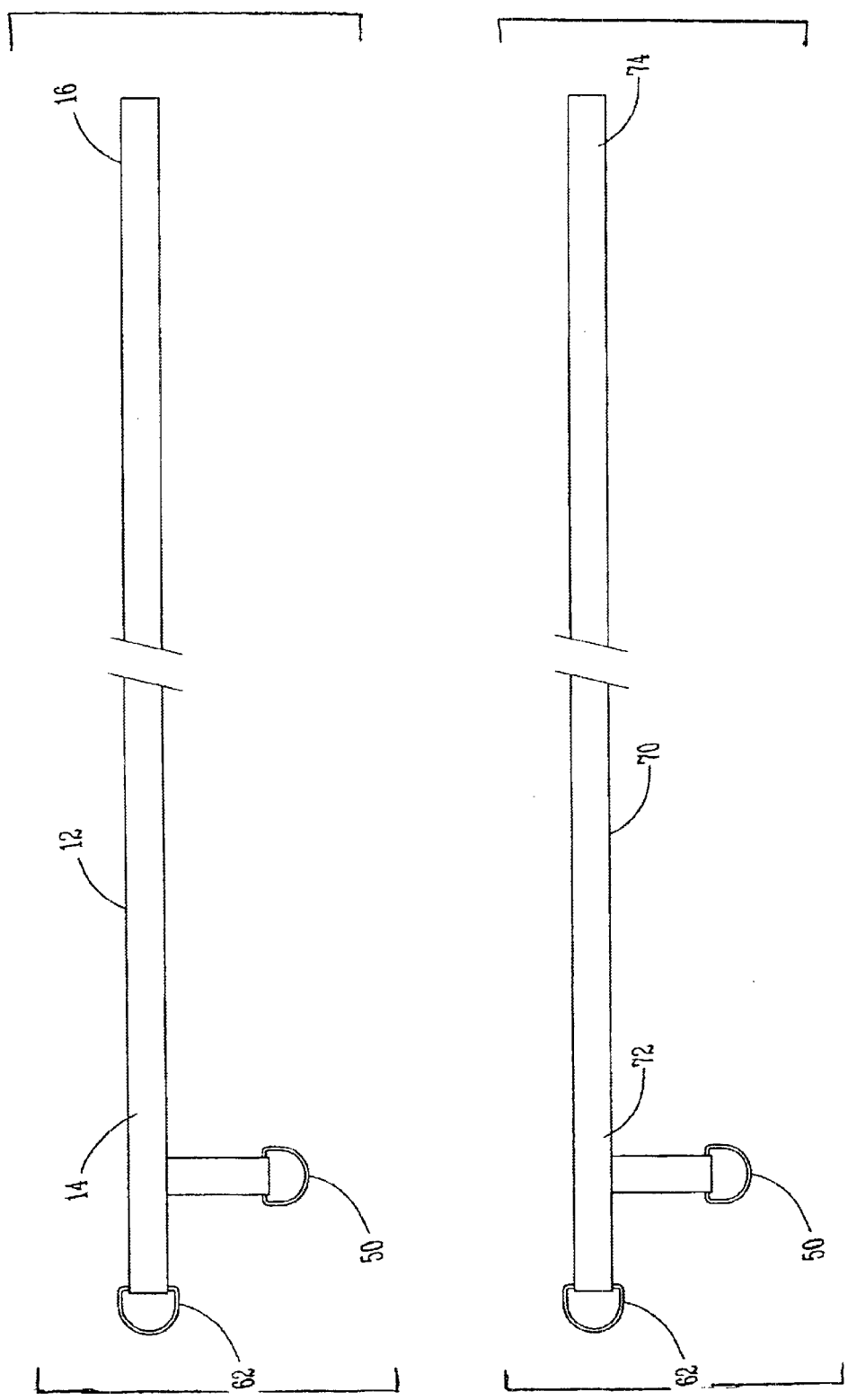
FIG. 2 is a plan view of two unconnected, flexible members.

FIG. 1 shows a first modification of the corrugated pipe connection stabilizing apparatus of the present invention generally as 10. The corrugated pipe stabilizing apparatus 10 comprises a first flexible member 12 with a first end 14 and a second end 16 (See FIG. 2). A first corrugated pipe section 20 comprising an outer surface 22 with at least one corrugation 24 and a male end (not shown) is overlapped with a female end (also not shown) of a second corrugated pipe section 30 comprising an outer surface 32 with at least one corrugation 34 to form a joint 40. Each corrugated pipe section 20 and 30, respectively, further comprises a circumference 42, 44 and an axis 46, 48.

Figure 3:
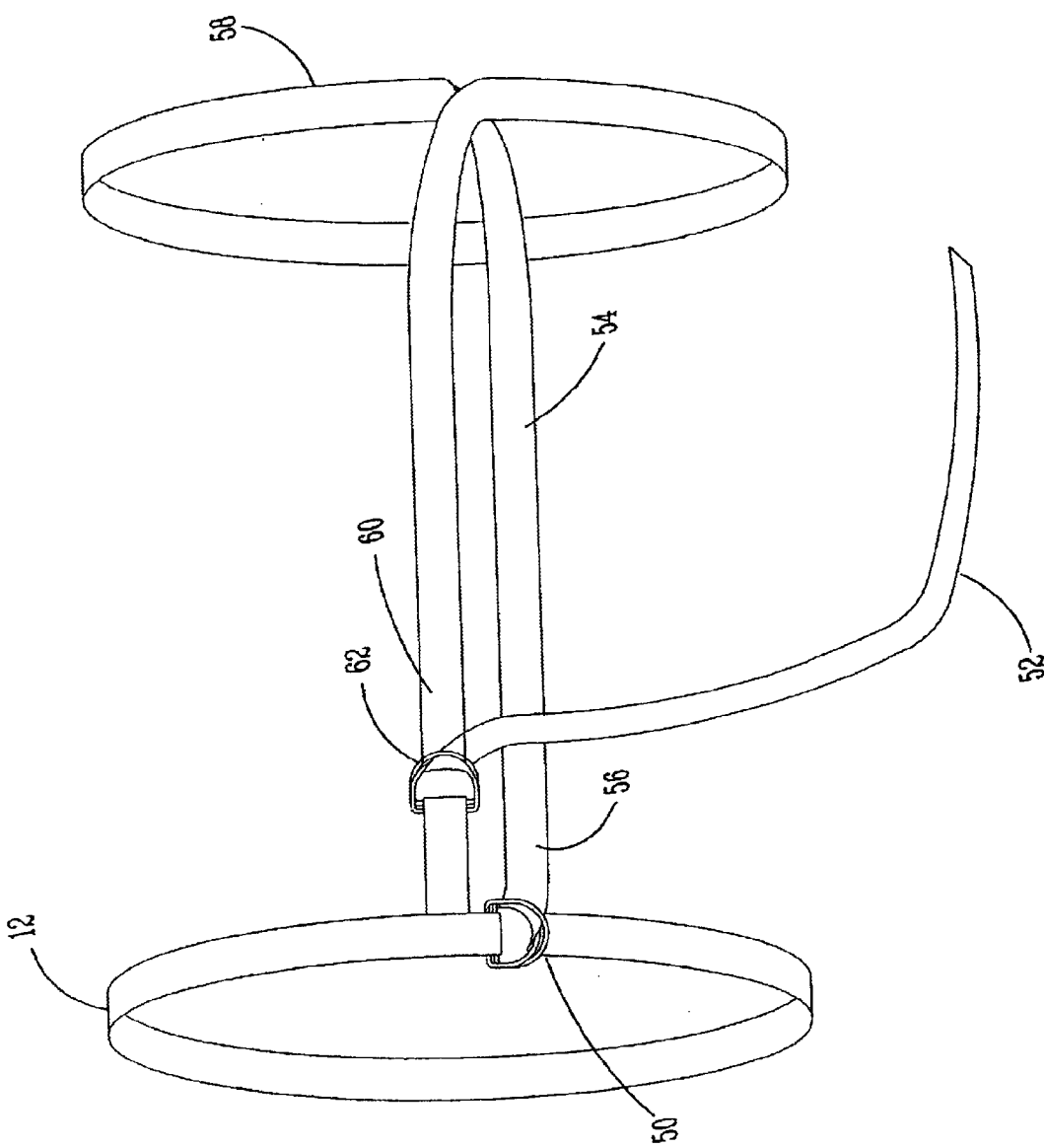
FIG. 3 is a perspective view of the stabilizing apparatus wherein one flexible member is shown in position with a first axially aligned support.

Shown best in FIGS. 1 and 3, the flexible member 12 is looped circumferentially around the first section of corrugated pipe 20. The flexible member 12 further comprises means 50 for associating the first end 14 with the second end 16 and for tightening the flexible member 12 circumferentially leaving a first tail portion 52. An axially aligned support 54 comprises a first segment 56 of the tail portion 52 stretched across the joint 40, a loop 58 of the tail portion secured against the at least one corrugation 34 on the second pipe section 30, a second segment 60 of the tail portion 52 stretched back across the joint 40, and means 62 for cinching the first end 14 of the first flexible member 12 to the first tail portion 52.

Figure 4:
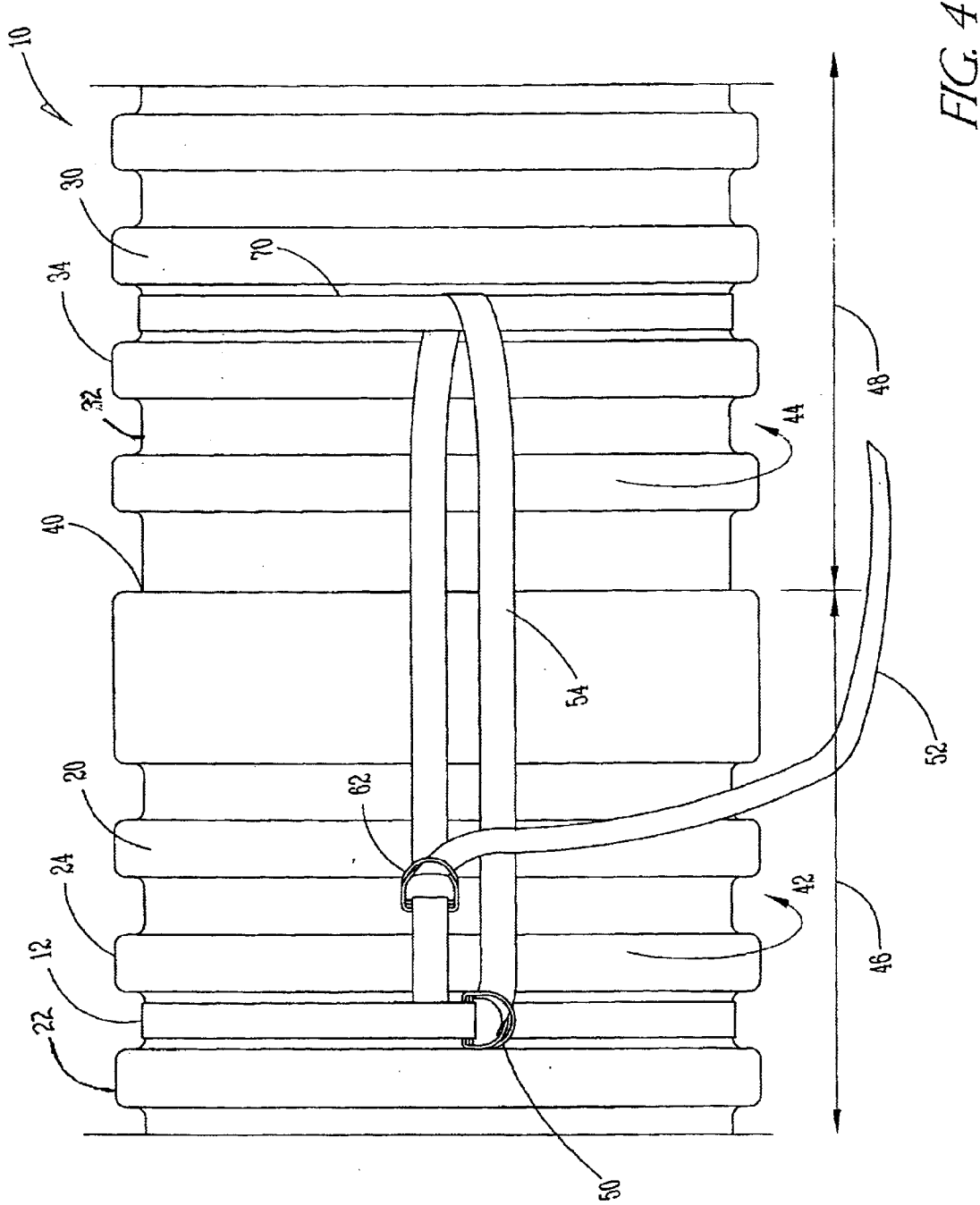
FIG. 4 is a perspective view of a joint of two sections of corrugated pipe showing a second embodiment of the stabilized apparatus of the present invention.
Figure 5:
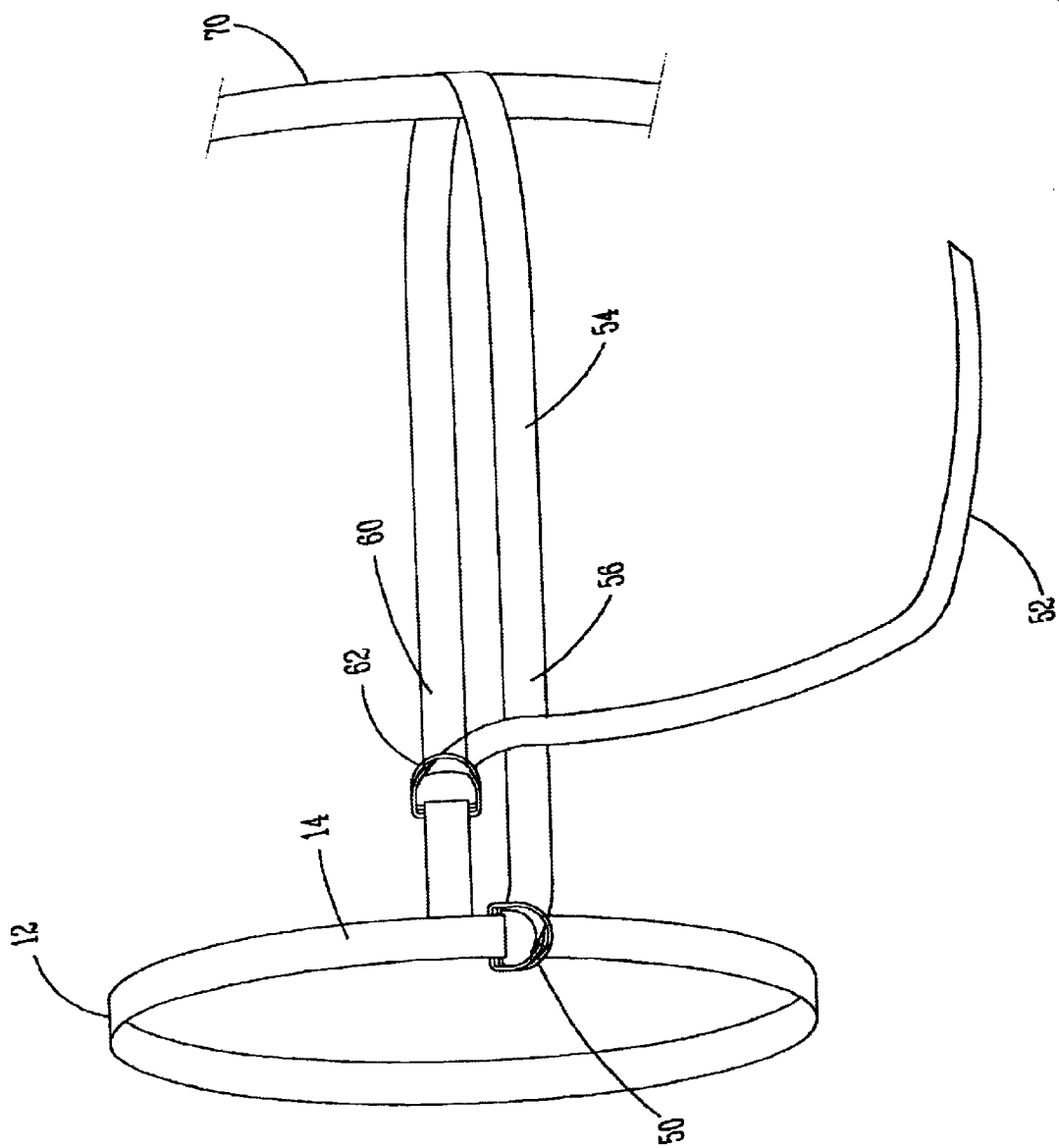
FIG. 5 is a perspective view of the stabilizing apparatus wherein the first flexible member is shown in position with the first axially aligned support.
Figure 6:
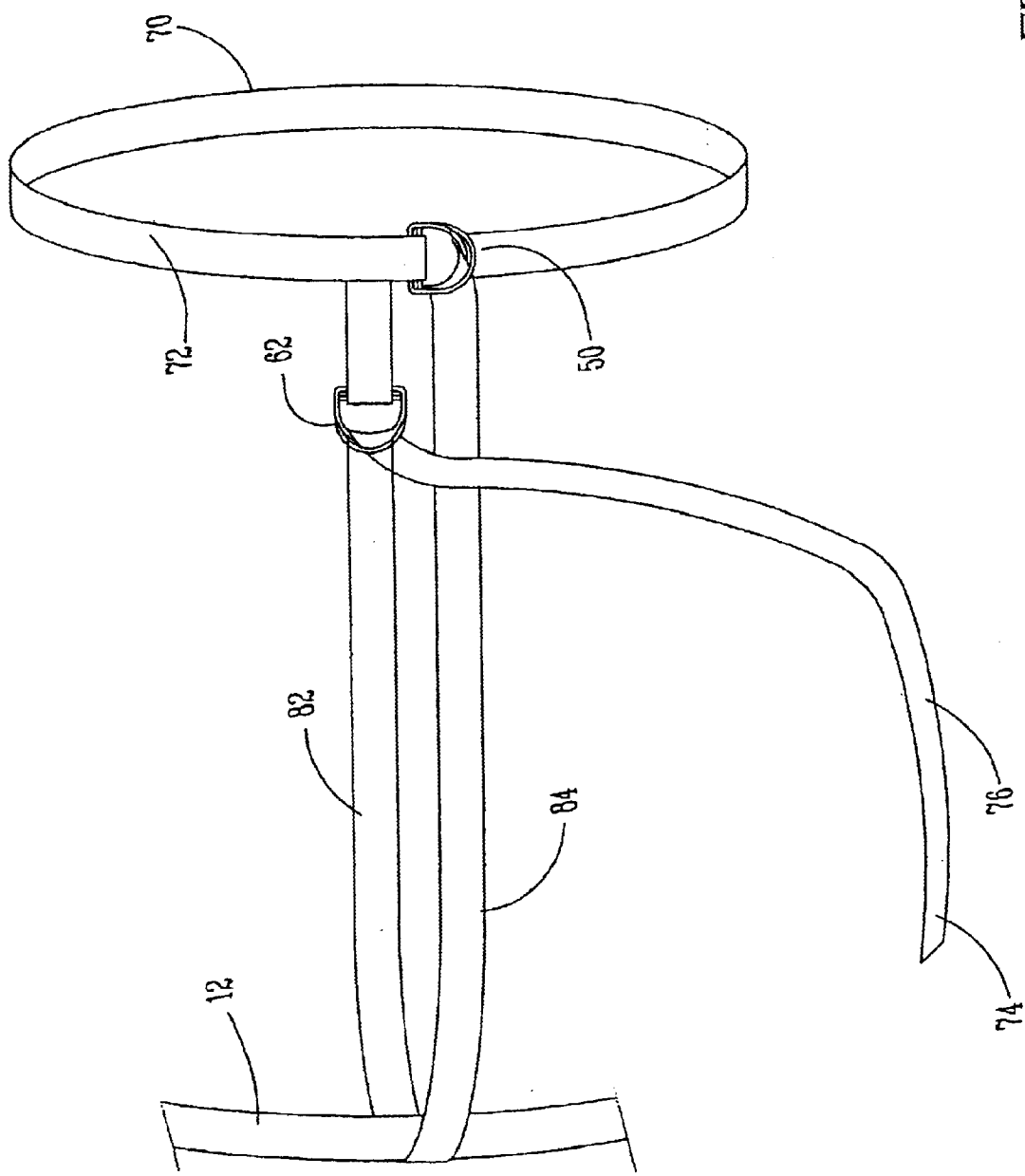
FIG. 6 is a perspective view of the opposite side of the stabilizing apparatus wherein the second flexible member is shown in position with the second axially aligned support.
Figure 7:
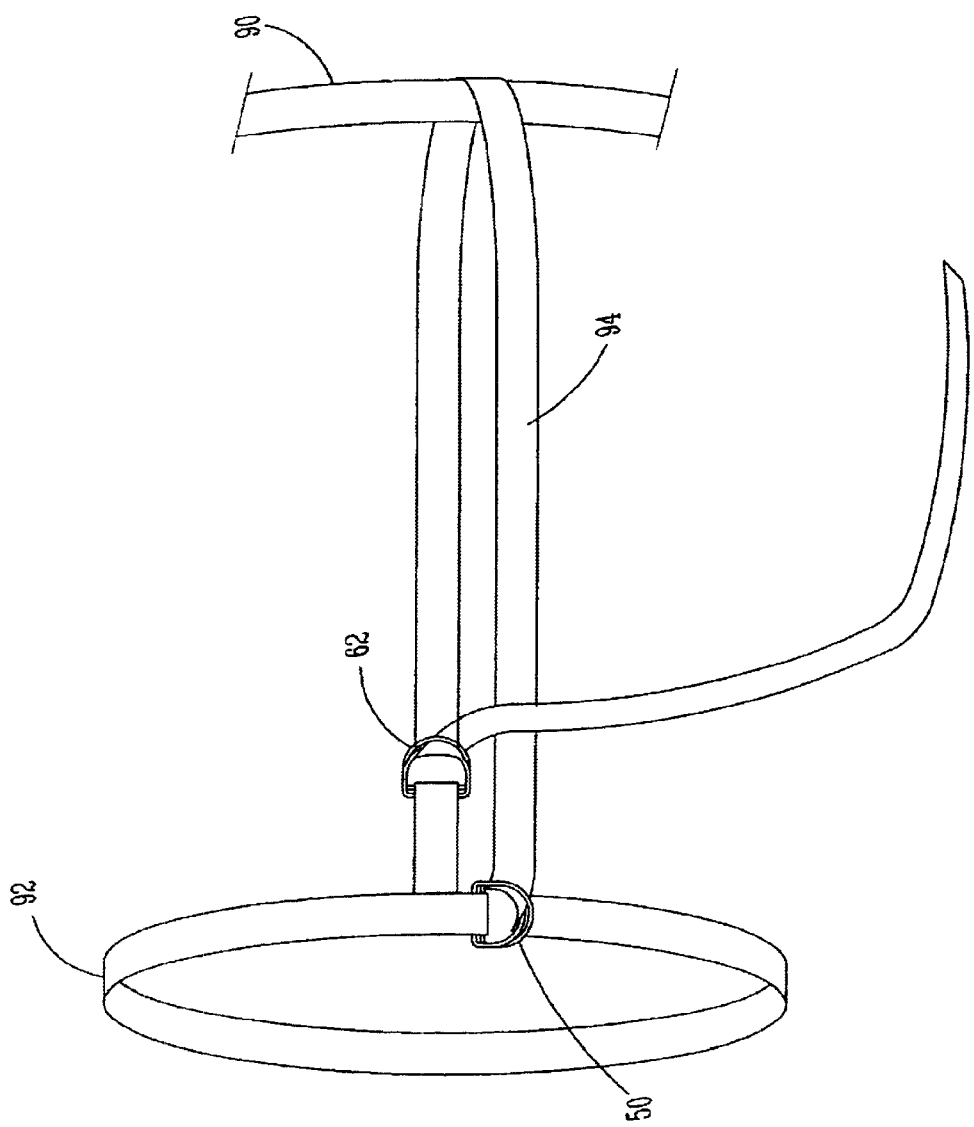
FIG. 7 is a perspective view of the top side of the stabilizing apparatus wherein a third flexible member is shown.
Figure 8:
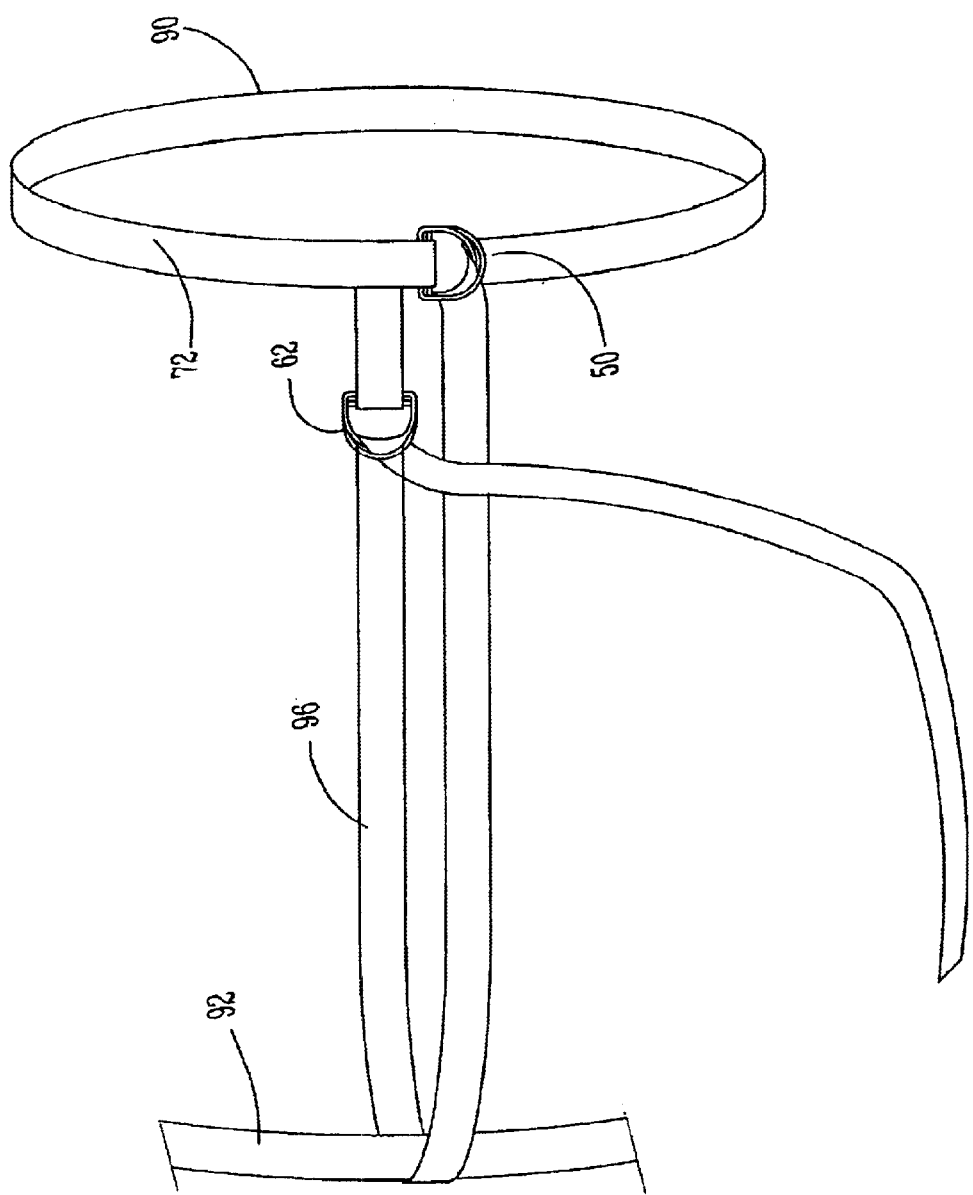
FIG. 8 is a perspective view of the bottom side of the stabilizing apparatus wherein a fourth flexible member is shown

A second and preferred embodiment shown in FIGS. 4–6 includes the first flexible member 12 comprising the first end 14 and the second end 16, and the means 50 for associating the first end 14 with the second end 16 and for tightening the first flexible member 12 circumferentially around the first pipe section 20 and leaving the first tail portion 52. A second flexible member 70 comprises a first end 72 and a second end 74. The second flexible member 70 is looped circumferentially around the second section of corrugated pipe 30. The second flexible member 70 further comprises means 50 for associating the first end 72 with the second end 74 and for tightening the second flexible member 70 circumferentially around the second pipe section 30 and leaving a second tail portion 76. In the preferred embodiment, the first and second flexible members, 12 and 70 respectively, are alike and are strap members of canvas, woven material or the like and the means 50 are double ring connectors. In another embodiment, the means 50 are generally flat, threadable connectors with teeth 50a. Such connectors are well known in the art used especially for tightening and holding in place canvas and woven straps.

As shown in FIGS. 4–6, the flexible members are used together to form axial supports. The combination from the front of the joint can be seen in FIG. 5. The first end 14 of the first flexible member 12 further comprises means 60 for cinching the tail portion 52 to the first end 14 of the first flexible member 12. In one embodiment, the first segment 56 of the first tail portion 52 is stretched across the joint 40, threaded between the second flexible member 70 on the second pipe section 30 and the pipe section 30, stretched back across the joint 40 and secured by the means 62 for cinching the tail portion 52 to the first end 14 of the first flexible member 12 thereby forming an axially aligned support 54. The axially aligned support 54 provides strength and stabilization for the joint.

In the preferred embodiment, the first end 72 of the second flexible member 70 also comprises means 62 for cinching the second tail portion 76 to the first end 72 of the second flexible member 70. Referring now to FIG. 6, a second axially aligned support 82 is created in exactly the same manner as the first support 54; a first segment 84 of the second tail portion 76 is stretched across the joint 40, threaded between the first flexible member 12 on the first pipe section 20 and the first pipe section 20, stretched back across the joint 40 and secured by means 62 for cinching the tail portion 76 to the first end 72 on the second flexible member 70. Here, the first flexible member 12 creates a first axially aligned support 54 and the second axially aligned support 82 is created by the second flexible member 70. The first and second axially aligned supports, 54 and 82, respectively, are preferably circumferentially spaced apart approximately 180 degrees around the joint 40. In the preferred embodiment, means 62 for cinching the tails of the flexible members to the first ends comprises double ring connectors. The means for cinching the tail portions to the flexible member are affixed on the first ends of the flexible members at approximately a 90 degree angle to the means for associating the first ends with the second ends of the flexible members. This positioning fosters the axial alignment of the supports.

The method for stabilizing a corrugated pipe connection prior to burying the connection comprises four steps. First, the male end of the first corrugated pipe section 20 is overlapped with the female end of the second corrugated pipe section 30, forming a joint 40. Second, the first flexible member 12 is looped around the circumference 42 of the first corrugated pipe section 20 and positioned against the at least one corrugation 24 on the corrugated pipe section 20. The first flexible member 12 is tightened using means 50 associated with the first end 14 for connecting the first end 14 to the second end 16 of the first flexible member 12 and the first tail portion 52 is left unrestrained for a purpose to be explained.

The third step is in mirror image of the second step wherein the second flexible member 70 is looped around the second corrugated pipe section 30 and tightened, also leaving the second tail portion 76 unrestrained.

The fourth step comprises creating an axially aligned support 54 across the joint 40. Associated with the first end 14 of the first flexible member 12 are means 62 for cinching the tail portion 52 of the first flexible member 12 to the first end 14 of the first flexible member 12. With each flexible member secured circumferentially around respective corrugated pipe sections, the first tail segment 56 of the first tail portion 52 of the first flexible member 12 is stretched across the joint 40 and axially aligned. The first tail portion 52 is then threaded between the second flexible member 70 and the second pipe section 30 and stretched back across the joint 40. The first tail portion 52 is finally associated with the means 62 for cinching the first tail portion such that the first axially aligned support 54 is formed and tension increased to the needed level to stabilize the joint 40 via means 62 for cinching.

In the preferred embodiment, the fourth step is reversed and mirrored for the second flexible member 70 to form a second axially aligned support 82.

The four steps can be repeated with a third strap member 90 and a fourth strap member 92 to create axially aligned supports 94 and 96.

Thus, the present invention has been described in an illustrative manner. It is to be understood that the terminology that has been used is intended to be in the nature of words of description rather than of limitation.

Many modifications and variations of the present invention are possible in light of the above teachings. For example, pipe with many corrugations or smooth pipe having just a single corrugation near the joint can be secured using this method and apparatus. The flexible members can be constructed not only of canvas or woven material, but of flexible metallic materials, as well. Finally, there are many different kinds of fasteners that might be applied. Therefore, within the scope of the appended claims, the present invention may be practiced otherwise than as specifically described.

I claim:

1. A corrugated pipe connection stabilizing apparatus comprising;
   a) a first flexible member and a second flexible member each comprising a first end and a second end;
   b) a first corrugated pipe section comprising a circumference, an axis, an outer surface with at least one corrugation, and a female end;
   c) a second corrugated pipe section comprising a circumference, an axis, an outer surface with at least one corrugation, and a male end associated with said female end of said first corrugated pipe section creating a joint;
   d) said first flexible member further comprising means for associating said first end with said second end of said first flexible member and for tightening said first flexible member circumferentially around said first corrugated pipe section against said at least one corrugation leaving an unrestrained first tail portion;
   e) said second flexible member further comprising means for associating said first end of the second flexible member with said second end of said second flexible member and for tightening said second flexible member circumferentially around said second corrugated pipe section against said at least one corrugation leaving an unrestrained second tail portion;
   f) said first end of said first flexible member further comprising means for cinching said first tail portion to said first end of said first flexible member for forming a first axially aligned support across said joint;
   g) said first axially aligned support comprising said first segment of said first tail portion of said first flexible member stretched across said joint, said tail portion threaded between said second flexible member and said second corrugated pipe section, stretched back across said joint and secured by said means for cinching said first tail portion of said first flexible member to said first end of said first flexible member.

2. A corrugated pipe connection stabilizing apparatus as claimed in claim 1 wherein said first end of said second flexible member further comprises means for cinching said second tail portion of said second flexible member to said first end of said second flexible member to form a second axially aligned support across said joint.

3. A corrugated pipe connection stabilizing apparatus as claimed in claim 2 wherein said second axially aligned support is circumferentially spaced apart from said first axially aligned support and comprises a first segment of said second tail portion of said second flexible member stretched across said joint, said second tail portion threaded between said first flexible member and said first corrugated pipe section, stretched back across said joint and secured by said means for cinching said second tail portion of said second flexible member to said first end of said second flexible member.

4. A corrugated pipe connection stabilizing apparatus as claimed in claim 1 wherein said first and second flexible members are formed of canvas straps.

5. A corrugated pipe connection stabilizing apparatus as claimed in claim 1 wherein said first and second flexible members are formed of woven straps.

6. A corrugated pipe connection stabilizing apparatus as claimed in claim 1 wherein said means associated with said first end for connecting said first end of said first flexible member to said second end of said first flexible member comprises a first double ring connector.

7. A corrugated pipe connection stabilizing apparatus as claimed in claim 3 wherein said means associated with said first ends of said flexible members for connecting to said second ends of said flexible members and means for cinching said tail portions of said flexible members to said first ends of said flexible members are double ring connectors.

8. A corrugated pipe connection stabilizing apparatus as claimed in claim 2 wherein said means for cinching said first tail portion of said flexible member to said first end of said flexible member comprises a threadable connector with teeth for securing said first end of said flexible member.

9. A corrugated pipe connection stabilizing apparatus as claimed in claim 2 wherein said means for cinching said first tail portion of said first flexible member to said first end of said first flexible member is positioned at an angle on said first end of said first flexible member away from said means for associating said first end with said second end of said first flexible member for fostering the axial alignment of the support.

10. A corrugated pipe connection stabilizing apparatus as claimed in claim 9 wherein said means for cinching said second tail portion of said second flexible member to said first end of said second flexible member is positioned at an angle on said first end of said second flexible member away from said means for connecting said first end to said second end of said second flexible member for fostering the axial alignment of the support.

11. A corrugated pipe connection stabilizing apparatus as claimed in claim 2 wherein said first axially aligned support is positioned in a circumferentially spaced apart relationship from said second axially aligned support for providing additional strength and stability to said corrugated pipe connection.

12. A method for stabilizing a corrugated pipe connection prior to burying said connection comprising:
   a) a first step wherein a female end of a first corrugated pipe section comprising at least one corrugation on an outside surface and a first circumference, and a male end of a second corrugated pipe section comprising at least one corrugation on an outside surface and a second circumference are associated creating a joint;
   b) a second step wherein a first strap member comprising a first end and a second end is looped around the circumference of said first corrugated pipe section against said at least one corrugation on said outside surface of said first corrugated pipe section and tightened using means associated with said first end for connecting said first end to said second end of said first strap member leaving a first tail portion;
   c) a third step wherein a second strap member comprising a first end and a second end is looped around the circumference of said second corrugated pipe section against said at least one corrugation on said outside surface of said second corrugated pipe section and tightened using means associated with said first end for connecting said first end to said second end of said second strap member leaving a second tail portion;
   d) a fourth step comprising forming a first axially aligned support wherein said support is created across said joint by stretching a first segment of said first tail portion of said first strap member across said joint, threading said first tail portion between said second strap member and said second corrugated pipe section, stretching said first tail portion back across said joint and using means for cinching said first tail portion of said first flexible member to said first end of said first flexible member to hold said first corrugated pipe section in position relative to said second corrugated pipe section.

13. The method for stabilizing a corrugated pipe connection prior to burying as claimed in claim 12 wherein the fourth step is mirrored for said second strap member and a second axially aligned support therefore formed is circumferentially spaced apart from said first axially aligned support.

14. The method for stabilizing a corrugated pipe connection prior to burying as claimed in claim 12 wherein the second, third, and fourth steps are repeated to include a third strap member and a fourth strap member and resulting is a third axially aligned support and a fourth axially aligned support.

15. The method for stabilizing a corrugated pipe connection prior to burying as claimed in claim 12 wherein said means associated with said first end for connecting said first end to said second end of said first strap member is a double ring connector.

16. The method for stabilizing a corrugated pipe connection prior to burying as claimed in claim 13 wherein said means for cinching said first tail portion of said first strap member to said first end of said first strap member and means for cinching said second tail portion of said second strap member to said first end of said second strap member comprise double ring connectors.

* * * * *